United States Patent Office 3,574,847
Patented Apr. 13, 1971

3,574,847
NEW ALKYL 2-METHYLPROPENYL KETOXIME
CARBAMATES AS INSECTICIDES
Alan R. Friedman, Portage, Mich., assignor to The
Upjohn Company, Kalamazoo, Mich.
No Drawing. Original application Dec. 22, 1966, Ser. No.
603,752, now Patent No. 3,454,642. Divided and this
application Feb. 17, 1969, Ser. No. 800,004
Int. Cl. A01n 9/20
U.S. Cl. 424—300                                                    6 Claims

ABSTRACT OF THE DISCLOSURE

New alkyl 2-methylpropenyl ketoxime carbamates are active against insects, e.g., houseflies, boll weevils, Mexican bean bettles, and house crickets—also other insect pests. The α- or azomethine carbon has a methyl, an ethyl, a propyl, or an isopropyl substituent. The carbamate nitrogen may be unsubstituted or mono-lower-alkyl substituted. The anti-methyl syn-2-methylpropenyl isomer appears to be more active than the anti-podal syn-methyl anti-2-methylpropenyl isomer.

SUMMARY OF THE INVENTION

This application is a division of application Ser. No. 603,752 filed December 22, 1966, now U.S. Pat. 3,454,642.

This invention pertains to novel chemical compounds, and is more particularly directed to new alkyl 2-methylpropenyl ketoxime carbamates of the formula

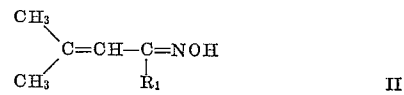

wherein R is hydrogen or lower-alkyl of from 1 to 6 carbon atoms, and $R_1$ is methyl, ethyl, propyl, or isopropyl. The invention is also directed to a new use of the alkyl 2-methylpropenyl ketoxime carbamates of Formula I for controlling insect pests, and to new insecticidal formulations comprising the new alkyl 2 - methylpropenyl ketoxime carbamates as the essential active ingredient. The new compounds have been found to be active against houseflies (*Musca domestica*), boll weevils (*Anthonomus grandis*), Mexican bean beetles (*Epilachna varivestis*), house crickets (*Acheta domesticus*), German cockroach (*Blattella germanica*), melon aphid (*Aphis gossypii*), yellow mealworm (*Tenebrio molitor*), and other insect pests.

The term "insects" is used herein in the same sense as in the Federal Insecticide, Fungicide, and Rodenticide Act of 1947 and refers generally to animals comprising the Phylum Arthropoda, illustratively, Class Insecta, for example, orders isoptera, thysanoptera, mallophaga, hemiptera, anoplura, homoptera, coleoptera, lepidoptera, orthoptera, diptera, and hymenoptera; and class arachnida, for example, orders araneae and acarina.

U.S. Pat. No. 3,256,330 describes certain pesticidal carbamyloximes of monocyclic ketones, particularly substituted and unsubstituted cyclohexanone and cyclohexenone N-alkylcarbamyloximes. Table I in column 10 of the patent shows the activities of the compounds tested against specified insects and the rootknot nematode.

Series of insecticidal trisubstituted acetaldehyde O-(methylcarbamoyl)oximes is described by Payne et al., Jour. Agr. Food Chem. 14, pp. 356–365 (1966). Interestingly enough, these investigators found that the ketoxime derivatives were "virtually inactive when compared with the aldoxime derivative, XII." They concluded that a methyl group attached to the azomethine carbon produces a detrimental effect. They also concluded from the activity of Compound VI ("2-methyl-propionaldehyde O-(methylcarbamoyl)oxime") that their theory about the desirability of a more exact fit for the acetylcholinesterase surface was correct. In contrast to Payne et al.'s conclusions and teachings, applicant has found that the alkyl 2-methylpropenyl ketoxime carbamates according to Formula I are effective insecticides even though the 2-carbon has a hydrogen atom and the azomethine carbon has a methyl, ethyl, propyl, or isopropyl substituent.

DETAILED DESCRIPTION

The new, insecticidal alkyl 2-methylpropenyl ketoxime carbamates of this invention (compounds according to Formula I) are prepared by conventional methods. Illustratively, alkyl 2-methylpropenyl ketoxime carbamates according to Formula I can be prepared by reacting alkyl 2-methylpropenyl ketoxime of the formula

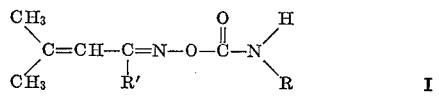

wherein $R_1$ is as defined, with phosgene in the presence of an acid acceptor to obtain an alkyl 2-methylpropenyl ketoxime chloroformate. The alkyl 2-methylpropenyl ketoxime chloroformate is then reacted with two equivalents of ammonia or a mono-lower-alkylamine (e.g., methylamine, ethylamine, propylamine, isobutylamine, 2-methylpentylamine, and the like) to produce the desired carbamate according to Formula I. Illustratveily, alkyl 2-methylpropenyl ketoxime carbamates according to Formula I wherein R is hydrogen are prepared by reacting ammonia with an alkyl 2-methylpropenyl ketoxime chloroformate.

N-mono-lower-alkylcarbamates according to Formula I are prepared preferably by reacting an alkyl 2-methylpropenyl ketoxime according to Formula II with a lower-alkyl isocyanate in the presence of an inert reaction medium. Advantageously, a small amount of a tertiary amine catalyst or an organotin catalyst is included in the reaction mixture. Suitable inert reaction media include benzene, toluene, diethyl ether, ethyl propyl ether, hexane, octane, and the like. Suitable tertiary amine catalysts include triethylamine (preferred), trimethylamine, N,N-dimethylethylamine, N,N-dimethylaniline, and the like. Suitable organotin catalysts include dibutyltin diacetate, dibutyltin dichloride, dibutyltin dimethoxide, stannous oleate, and the like.

The reaction of alkyl 2-methylpropenyl ketoxime of Formula II and the selected lower-alkyl isocyanate proceeds at temperatures ranging from about 10° C. to about 130° C., and is preferably effected at temperatures between about 25° C. and about 85° C. The reaction may be exothermic; and within the preferred temperature range is usually completed in about one-half to about 6 hrs.

The N-mono-lower-alkylcarbamate product is recovered by conventional methods such as removing the solvent by evaporation, by filtration when the carbamate product separates from the reaction mixture, or by distillation under reduced pressure. The carbamate product is purified by crystallization or recrystallization from suitable solvents such as diisopropyl ether, ethyl acetate, diethyl ether, technical hexane (Skellysolve B—a mixture of isomeric hexanes boiling range of 140° to 160° F.), and the like.

Since, as Harries et al. pointed out in Berichte 31, p. 1371 (1898), there are two isomeric oximes of mesityl oxide, there exists the probability of two antipodal oxime carbamates according to this invention. As a matter of fact, the available evidence indicates the production of the expected two antipodes. Interestingly enough, there is further evidence that the two antipodes are not equivalent in their insecticidal action. Thus in accordance with the invention, it has been found that the antipode designated anti-methyl syn-2-methylpropenyl with respect to the methylcarbamoyloxy group is more active insecticidally than the antipode designated syn-methyl anti-2-methylpropenyl.

The usual preparation of methyl 2-methylpropenyl ketoxime by reacting methyl 2-methylpropenyl ketone (mesityl oxide) with hydroxylamine hydrochloride in the presence of sodium acetate and ethanol yields a mixture of oxime isomers of about 3 parts syn-anti and 1 part anti-syn as designated above. When the 3:1 oxime mixture is carbamylated with methyl isocyanate, there is isolated an isomeric mixture of methyl 2-methylpropenyl ketoxime N-methylcarbamate having about 18% the most active isomer and about 82% the less active isomer. When tested against boll weevils, house crickets, German cockroaches, houseflies, and Mexican bean beetles the 18%:82% mixture gave the following results:

TABLE I

[Insect kill in percent after designated time interval]

| Concentrate in weight, percent | Boll weevil, 48 hours | House crickets, 48 hours | German cockroach, 48 hours | Houseflies, 24 hours | Mexican bean beetle, 72 hours |
|---|---|---|---|---|---|
| 0.2 | 100 | 100 | 100 | 100 | 100 |
| 0.1 | 100 | 100 | 100 | 80 | 100 |
| 0.05 | 100 | 90 | 70 | 40 | 40 |
| 0.025 | 90 | 70 | 0 | 50 | 0 |
| 0.0125 | 30 | 20 | 0 | 50 | 0 |

During development of the invention, it was observed that the less active isomer crystallizes preferentially during the carbamylation with methyl isocyanate. This coincidence provided a means of preparing an isomeric mixture enriched with respect to the more active isomer. Consequently, an original methylcarbamylation reaction mixture was filtered to remove crystalline product. The oil remaining was found to contain 60% the less active syn-methyl anti-2-methylpropenyl ketoxime N-methylcarbamate and 40% the corresponding anti-syn more active isomer. When tested against house crickets, German cockroaches, houseflies, Mexican bean beetles, melon aphid, and yellow mealworm, the 60%:40% mixture gave the following results:

TABLE II

[Insect kill in percent after designated time interval]

| Concentrate in weight, percent | House crickets, 48 hours | German cockroach, 48 hours | Houseflies, 24 hours | Mexican bean beetle, 66 hours | Melon aphid, 48 hours | Yellow mealworm, 48 hours |
|---|---|---|---|---|---|---|
| 0.2 | 100 | 100 | 100 | 100 | 98 | 80 |
| 0.1 | 100 | 100 | 40 | 100 | 50 | 40 |
| 0.05 | 100 | 70 | 70 | 100 | 0 | 0 |
| 0.025 | 100 | 80 | 20 | 20 | 0 | 0 |
| 0.0125 | 100 | 10 | 0 | 20 | 0 | 0 |

The more active isomer designated anti-methyl syn-2-methylpropenyl ketoxime N-methylcarbamate was obtained in pure form having a melting point at 66.5° to 67.5° C. This isomer when tested against boll weevil, confused flour beetle, house crickets, German cockroach, houseflies, Mexican bean beetle, melon aphid, yellow mealworm, and flesh fly gave the following results:

TABLE III

[Insect kill in percent after designated time interval]

| Concentrated weight, percent | Boll weevil, 24 hours | Confused flour beetle, 48 hours | House crickets, 48 hours | German cockroach, 48 hours | Houseflies, 24 hours | Mexican bean beetle, 48 hours | Melon aphid, 48 hours | Yellow mealworm, 48 hours | Flesh fly, 48 hours |
|---|---|---|---|---|---|---|---|---|---|
| 0.2 | | 50 | 100 | 100 | 100 | 100 | 90 | 100 | 100 |
| 0.1 | 100 | 30 | 100 | 80 | 100 | 100 | 50 | 20 | 100 |
| 0.05 | 100 | 20 | 100 | 50 | 100 | 100 | 10 | 60 | 20 |
| 0.025 | 40 | 10 | 100 | 40 | 94 | 100 | 10 | 20 | 20 |
| 0.0125 | 60 | 20 | 60 | 0 | 100 | 20 | 10 | 0 | 0 |
| 0.00625 | 0 | 20 | 0 | 0 | 23 | 0 | 0 | 20 | |

The less active antipode designated syn-methyl anti-2-methylpropenyl ketoxime N-methylcarbamate gave the following results against house crickets, German cockroaches, houseflies, and Mexican bean beetles:

TABLE IV

[Insect kill in percent after designated time interval]

| Concentrate weight, percent | House crickets, 48 hours | German cockroaches, 48 hours | Houseflies, 24 hours | Mexican, bean beetle, 66 hours |
|---|---|---|---|---|
| 0.2 | 90 | 80 | 20 | 40 |
| 0.1 | 100 | 10 | 0 | 20 |
| 0.05 | 80 | 10 | 0 | 0 |
| 0.025 | 50 | 0 | 0 | 0 |
| 0.0125 | 0 | 0 | 0 | 0 |

The foregoing comparative results indicate greater insecticidal activity wtih the isomer designated anti-methyl syn-2-methylpropenyl.

The following examples are illustrative of the new alkyl 2-methylpropenyl ketoxime carbamates, the new insecticidal compositions, and the new method of insect control as contemplated within the scope of this invention. The examples are not to be construed as limiting the invention.

EXAMPLE 1

Preparation of methyl 2-methylpropenyl ketoxime N-methylcarbamate

A quantity of methyl 2-methylpropenyl ketoxime mixed isomers (mesityl oxide oxime) (11.21 gm., 0.10 mole) was dissolved in 100 ml. benzene, and 6.27 gm. (0.11 mole) methyl isocyanate was added along with 1.0 ml. triethylamine. The temperature of the reaction mixture increased spontaneously to about 40° C. After cooling to about 25° C., the reaction mixture was stirred for about 16 hrs. The benzene and excess methyl isocyanate were removed by evaporation under reduced pressure to give an oil which partially crystallized. The crystals were recovered on a filter. Their melting point was 30° to 45° C. Bio-assay and nuclear magnetic resonance (NMR) data indicated 18% the more active anti-methyl syn-2-methylpropenyl isomer.

A sample recrystallized from a mixture of diethyl ether and technical hexane had a melting point of 38° to 45° C.

*Analysis.*—Calc'd for $C_8H_{14}N_2O_2$: C, 56.45; H, 8.29; N, 16.46. Found: C, 56.44; H, 8.31; N, 16.65.

A further recrystallization from diethyl ether gave crystals melting at 47° to 48° C. These crystals are designated the syn-methyl anti-2-methylpropenyl isomer. The following NMR data indicate the isomeric purity and identity of this product:

| δ | Number of protons | Multiplicity |
|---|---|---|
| 6.34 | 1 | Broad. |
| 5.66 | 1 | Multiplet. |
| 2.90 | 3 | Doublet. |
| 2.08 | 3 | Singlet. |
| 1.96 | 3 | Doublet. |
| 1.88 | 3 | Do. |

Bio-assay and NMR data indicated that the oil filtrate obtained above was 60% the syn-anti less active isomer and 40% the anti-syn more active isomer.

EXAMPLE 2

Preparation of anti-methyl syn-2-methylpropenyl ketoxime N-methylcarbamate

Part A, anti-methyl syn-2-methylpropenyl ketoxime.—A mixture consisting of 19.6 gm. (0.2 mole) mesityl oxide, 200 ml. methanol, and 13.9 gm. (0.2 mole) hydroxylamine hydrochloride was heated at the reflux temperature for 1½ hrs. After cooling the reaction mixture to about 25° C., the methanol was removed by evaporation under reduced pressure. The solid thus obtained was recrystallized from ethyl acetate. The thus-obtained crystals of anti-methyl syn-2-methylpropenyl ketoxime hydrochloride were dissolved in water and the solution was neutralized with 5% aqueous potassium carbonate. The neutralized aqueous solution was extracted with ether, and the ether phase was separated and dried. After removing the ether from the ether extract by evaporation there remained anti-methyl syn-2-methyl-propenyl ketoxime as a whole solid.

Part B, anti-methyl syn-2-methylpropenyl ketoxime N-methylcarbamate.—A reaction mixture consisting of 3.0 gm. (0.026 mole) antimethyl syn-2-methylpropenyl ketoxime (Part A, above), 50 ml. diethyl ether, 2.0 ml. methyl isocyanate, and 5 drops triethylamine was stirred for 1 hr. before the ether was removed by evaporation under reduced pressure. There was thus obtained a solid that upon recrystallization from technical hexane had a melting point of 66.5° to 67.5° C.

*Analysis.*—Calc'd for $C_8H_{14}N_2O_2$: C, 56.45; H, 8.29; N, 16.46. Found: C, 56.64; H, 8.33; N, 16.40.

This product is designated the anti-syn isomer. The following NMR data indicate the isomeric purity and identity of this product:

| δ | Number of protons | Multiplicity |
|---|---|---|
| 6.32 | 1 | Broad. |
| 6.05 | 1 | Multiplet. |
| 2.87 | 3 | Doublet. |
| 2.08 | 3 | Singlet. |
| 1.86 | 3 | Doublet. |
| 1.79 | 3 | Do. |

EXAMPLE 3

Preparation of ethyl 2-methylpropenyl ketoxime N-methylcarbamate

Following the procedure of Example 1 but substituting ethyl 2-methylpropenyl ketoxime for methyl 2-methylpropenyl ketoxime there was prepared ethyl 2-methylpropenyl ketoxime N-methylcarbamate having a melting point of 43° to 44.5° C. after recrystallization from a mixture of ether and technical hexane.

*Analysis.*—Calc'd for $C_9H_{16}N_2O_2$: C, 58.67; H, 8.75; N, 15.21. Found: C, 58.31; H, 8.51; N, 15.08.

Nuclear magnetic resonance data:

| δ | Number of protons | Multiplicity |
|---|---|---|
| 6.31 | 1 | Broad. |
| 5.63 | 1 | Multiplet. |
| 2.90 | 3 | Doublet. |
| 2.53 | 2 | Quartet. |
| 1.95 | 3 | Doublet. |
| 1.90 | 3 | Do. |
| 1.10 | 3 | Triplet. |

The foregoing NMR data indicate that the crystalline ethyl 2-methylpropenyl ketoxime N-methylcarbamate melting at 43° to 44.5° C. is the syn-ethyl anti-2-methylpropenyl isomer.

EXAMPLE 4

Following the procedure of Example 1, but substituting propyl 2-methylpropenyl ketoxime and isopropyl 2-methylpropenyl ketoxime for methyl 2-methylpropenyl ketoxime, there were obtained the corresponding propyl 2-methylpropenyl ketoxime N-methylcarbamate and isopropyl 2-methylpropenyl ketoxime N-methylcarbamate.

EXAMPLE 5

Following the procedure of Example 1, but substituting ethyl isocyanate, propyl isocyanate, isopropyl isocyanate, butyl isocyanate, tert-butyl isocyanate, pentyl isocyanate, and 2-methylpentyl isocyanate for methyl isocyanate there were prepared the respective N-ethylcarbamate, the N-propylcarbamate, the N-isopropylcarbamate, the N-butylcarbamate, the N-tert-butylcarbamate, the N-pentylcarbamate, and the N-2-methylpentylcarbamate of methyl 2-methylpropenyl ketoxime.

The new insecticidal alkyl 2-methylpropenyl ketoxime carbamates of this invention can be used as the pure compounds; but for practical reasons, the compounds are preferably formulated as insecticidal compositions. More particularly, the new alkyl 2-methylpropenyl ketoxime carbamates are preferably formulated with a diluent carrier. Many different kinds of dispersible insecticide carriers are commonly used in the art. Such carriers may or may not include adjuvants.

For example, insecticidal compositions useful against insects which infest plants can be formulated as dusts, wettable powders, emulsifiable concentrates, aqueous dispersions, solutions, and flowable creams for application to foliage, seeds, or other parts of plants. Compositions suitable for root or bole infusion can be made. Moreover, the new alkyl 2-methylpropenyl ketoxime carbamates of the invention can be the sole active agent in a composition, or other insecticidal, fungicidal, virucidal, bactericidal, or synergistic components may be ncluded.

The alkyl 2-methylpropenyl ketoxime carbamates of this invention can be readily formulated as dusts by grinding a mixture of the compound and a pulverulent carrier in the presence of each other. Grinding is conveniently accomplished in a ball mill, a hammer mill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to animals, inanimate matter, fruit trees, crop plants, and soil so as to effect thorough distribution and coverage. Dusts are particularly adapted for effectively controlling insects over wide areas when applied by airplane. They are also indicated for application to the undersides of plant foliage and to the skin of hairy animals.

Representative suitable pulverulent carriers, include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium carbonate, precipitated calcium silicate, synthetic magnesium silicate, and colloidal silica; and organic flours such as wood, walnut shell, soybean, cottonseed, and tobacco flours, and free-flowing, hydrophobic starches.

Dusts can also be prepared by dissolving an alkyl 2-methylpropenyl ketoxime carbamate in a volatile solvent such as methylene chloride, mixing the solution with a pulverulent carrier and evaporating the solvent.

The proportions of pulverulent carrier and alkyl 2-methylpropenyl ketoxime carbamate can vary over a wide range depending upon the insects to be controlled and the conditions of treatment. In general, dust formulations can contain up to about 90% (on a weight basis) of the active ingredient. Dusts having as little as 0.001% of the active ingredient can be used, but a generally preferred proportion is from about 0.50% to about 20% of active ingredient.

The dispersible powder formulations of this invention are prepared by incorporating a surfactant in a dust composition prepared as described above. When about 0.1% to about 12% of a surfactant is incorporated in a dust, the dispersible powder thus obtained is particularly adapted for further admixture with water for spraying on inanimate matter and products, fruit trees, field crops, soil, and livestock. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10% to about 80% of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H-77), blends of polyoxyethylene ethers and oil-soluble sulfonates (Emcol H-400), blends of alkyl aryl sulfonates and alkylphenoxy polyethoxy ethanols (Tritons X-151, X-161, and X-171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X-100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

| | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) active ingredient which can be applied to insects, plants or other insect habitats, or insect foods to control insects.

If desired, dispersants such as methyl cellulose, polyvinyl alcohol, sodium lignisulfonates, and the like can be included in the dispersible powder formulations of this invention. Adhesive or sticking agents such as vegetable oils, naturally occurring gums, casein, and others can also be included. Corrosion inhibitors such as epichlorohydrin and anti-foaming agents such as stearic acid can also be included.

The compounds of this invention can be applied to insects, objects, or situs in aqueous sprays without a solid carrier. Since, however, the compounds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in the water and any excess alkyl 2-methylpropenyl ketoxime carbamate will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which alkyl 2-methylpropenyl ketoxime carbamates are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for applying to insects.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5% to about 50% by weight, preferably from about 10% to about 40%. A concentrate comprising 20% (by weight) of the compound dissolved in a water-immisible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. (parts per million) of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The rates of application to insects, objects, or situs will depend upon the species of insects to be controlled, the presence or absence of desirable living organisms, temperature conditions of treatment, and the method and efficiency of application. In general, insecticidal activity is obtained when the compounds are applied at concentrations of about 100 to about 6000 p.p.m., preferably at concentrations of about 500 to about 4000 p.p.m.

The compositions containing alkyl 2-methylpropenyl ketoxime carbamates according to the invention, can be applied to insects, objects or situs by conventional methods. For example, an area of soil, a building, or plants can be treated by spraying wettable powder suspensions, emulsions, or solutions from power sprayers or from hand-operated knapsack sprayers. Dips can be used for livestock. Dusts can be applied by power dusters, or by hand-operated dusters. Creams and ointment formulations can be applied to skin or objects for prolonged protection from insects.

The active compounds of the invention can also be formulated in relatively dilute proportions in a dispersible insecticide carrier for household applications. Thus, the active compounds can be formulated in dusts having from about 0.1% to 5.0% active ingredient with a dusting powder as hereinbefore described, and in solutions containing from about 0.01% to about 5.0% active ingredient with deodorized kerosene for aerosol applications.

It will of course be appreciated that the conditions encountered when applying the method and compositions of this invention to actual practice can vary widely. Included among the variables that may be encountered are the degree of infestation by insects, the particular insect to be controlled, the particular situs being treated, the age or degree of development of animals or plants, the prevailing weather conditions, such as temperature, relative humidity, rainfall, dews, and so forth.

Further in accordance with this invention, it has been found that the insecticidal activity of the new ketoxime carbamates is significantly enhanced when compounded with piperonyl butoxide, sesamex (Sesoxane), propyl isome, sulfoxide, sesame oil extractives, and octachlorodipropyl ether. See Kenaga, Bull. Entomol. Soc. Amer. 6, 55 (1960). Illustratively, the activity of a 0.0125% concentration of methyl 2-methylpropenyl ketoxime N-methylcarbamate against houseflies was about doubled by mixing 1 part of the compound with 5 parts of sesamex (Sesoxane). The sesamex alone showed no activity under the same conditions. The synergistic combinations can be formulated as aqueous emulsions, as dry or wettable powders, as solutions to be applied as aerosols, or in other vehicles. The relative proportions of the synergistic components can vary widely depending upon the insect pest to be controlled; however, from 0.5 to 20 parts of a synergistic compound as noted above to 1 part of carbamate is generally satisfactory. The compositions can contain from about 0.05% to 75% of the synergistic components in the emulsions, dry or wettable powders, solutions to be applied as aerosols, or other vehicles.

A suitable aerosol formulation is obtained by admixing the following materials:

Active ingredient _____ mg__ 20
Sesamex _____ mg__ 100
Acetone _____ ml__ 20
Deodorized kerosene _____ ml__ 80

The active ingredient and sesamex are dissolved in the acetone; the resulting solution is then thoroughly mixed with the deodorized kerosene. This mixture is placed in an aerosol bomb pressurized with nitrogen, to provide a spray containing about 250 p.p.m. of active ingredient after evaporation of the acetone. This formulation is very convenient for home use, for example, in destroying houseflies, mosquitoes, etc.

The novel compounds described herein are versatile insecticidal agents which can be employed for many purposes, e.g., in agriculture, in industry, in the home, etc. The compounds exhibit anticholinesterase activity.

I claim:
1. The method of controlling insect pests which comprises contacting the insect pests with an insecticidal amount of an alkyl 2-methylpropenyl ketoxime carbamate of the formula:

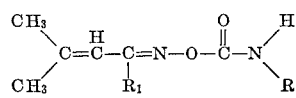

wherein R is hydrogen or lower-alkyl of from 1 to 6 carbon atoms, and $R_1$ is methyl, ethyl, propyl, or isopropyl.

2. The method according to claim 1 wherein methyl 2-methylpropenyl ketoxime N-methylcarbamate is used.

3. The method according to claim 2 wherein the isomer designated anti-methyl syn-2-methylpropenyl with respect to the N-methylcarbamoyloxy group is used.

4. The method according to claim 2 wherein both the anti-methyl syn-2-methylpropenyl isomer and the syn-methyl anti-2-methylpropenyl isomer are present.

5. The method according to claim 4 wherein there is about 18% the anti-methyl syn-2-methylpropenyl isomer and about 82% the antipodal syn-methyl anti-2-methylpropenyl isomer.

6. The method according to claim 4 wherein there is about 40% the anti-methyl syn-2-methylpropenyl isomer and about 60% the antipodal syn-methyl anti-2-methylpropenyl isomer.

References Cited
UNITED STATES PATENTS 3,063,823  11/1962  Kühle _____ 71—106
3,256,330   6/1966  Kilsheimer et al. ____ 424—327
3,299,137   1/1967  Payne et al. _____ 424—327

ALBERT T. MEYERS, Primary Examiner

V. D. TURNER, Assistant Examiner